United States Patent [19]
Ryu

[11] Patent Number: 5,995,029
[45] Date of Patent: Nov. 30, 1999

[54] PARALLEL BIT COUNTER USING BIT SORTERS

[75] Inventor: Myung Sunn Ryu, Kyoungki-do, Rep. of Korea

[73] Assignee: Hyundai Electronics Industries Co., Ltd., Kyoungki-do, Rep. of Korea

[21] Appl. No.: 08/960,227

[22] Filed: Oct. 29, 1997

[30] Foreign Application Priority Data

Nov. 6, 1996 [KR] Rep. of Korea .................. 96-52250

[51] Int. Cl.⁶ .................. G06F 7/00; H03M 9/00
[52] U.S. Cl. .................. 341/101; 708/210; 707/7
[58] Field of Search .................. 341/101, 100, 341/50, 53, 63; 327/31, 36; 375/340; 377/106, 101, 114; 708/210; 707/7

[56] References Cited

U.S. PATENT DOCUMENTS

| | | | |
|---|---|---|---|
| 4,456,884 | 6/1984 | Yarborough, Jr. | 341/72 |
| 4,636,753 | 1/1987 | Geller et al. | 333/26 |
| 4,652,942 | 3/1987 | Eto | 341/50 |
| 4,978,957 | 12/1990 | Hotta et al. | 341/156 |
| 5,220,581 | 6/1993 | Ferraiolo et al. | 375/10 |
| 5,307,343 | 4/1994 | Bostica et al. | 370/398 |
| 5,892,848 | 4/1999 | Nishiwaki et al. | 382/232 |

FOREIGN PATENT DOCUMENTS

0169048A2  1/1986  European Pat. Off. .

OTHER PUBLICATIONS

Patent Abstracts of Japan, vol. 9, No. 81 (E–307), Apr. 10, 1985 corresponding to JP 59 212002 A (Mitsubishi Denki KK) dated Nov. 30, 1984.

D. A. Williams, "Millimeter–Wave Components and Subsystems Bult Using Microstrip Technology", IEEE Transactions On Microwave Theory and Techniques, vol. 39, No. 5, May 1, 1991, pp. 768–774, XP000201471.

Patent Abstracts of Japan, vol. 8, No. 277 (E–285), Dec. 18, 1984 corresponding to JP 59 146201 A (Yamagata Diagaku) Aug. 22, 1984.

*Primary Examiner*—Howard L. Williams
*Assistant Examiner*—Peguy JeanPierre
*Attorney, Agent, or Firm*—Thelen Reid & Priest, LLP

[57] ABSTRACT

A parallel bit counter for counting the number of bits having a particular level in parallel input data. The counter includes a 2-bit sorter adapted to sort "high" and "low" bit fields of parallel input data in accordance with a bit sort method, and a caster adapted to detect a boundary between the sorted "high" and "low" bit fields and to code the resultant signal obtained after the detection, indicative of the number of "high" bits included in the input data, into its equivalent binary form. Accordingly, the counter can prevent a degradation in the counting speed resulting from a multiple adder operation and a carry set-up time.

13 Claims, 4 Drawing Sheets

PARALLEL BIT COUNTER USING BIT SORTERS

BACKGROUND OF THE INVENTION

1. Field of the Invention

The present invention relates to a parallel bit counter using bit sorters, and more particularly to a parallel bit counter in which bits of a particular level in data input in parallel are counted at a high speed, using a bit sorter system and a caster.

2. Description of the Prior Art

Counting bits of a particular level in parallel data of n bits externally input may be achieved by use of a serial counter, adapted to count every one bit, or an adder.

However, where a serial counter is used, n clock pulses corresponding to the n bits of the input data should be used. Where the adder is used, $\log_2 n$ clock pulses should be used. As a result, the entire counting time is considerably lengthened.

SUMMARY OF THE INVENTION

Therefore, an object of the invention is to solve the above-mentioned problem involved in the prior art and to provide a parallel bit counter configured to sort "high" and "low" bit fields of parallel input data in accordance with a bit sorting, to detect a boundary between the sorted "high" and "low" bit fields by use of a caster, and to code the resultant signal obtained after the detection, indicative of the number of "high" bits included in the input data, into its equivalent binary form.

In accordance with the present invention, this object is accomplished by providing a counter for counting the number of bits having a particular level in parallel input data consisting of n ("n" is a natural number) bits, comprising: a sorter having n input terminals respectively adapted to receive the n bits of the parallel input data and n output terminals respectively adapted to output n output bits, the sorter serving to sort "high" and "low" bit fields of the input data, respectively; and a caster having n input terminals respectively adapted to receive the n output bits from the sorter and n output terminals, the caster including a detecting unit adapted to detect a boundary between the "high" and "low" bit fields of the data sorted by the sorter, and a binary coding unit adapted to code output data from the detecting unit, indicative of the number of "high" bits included in the input data, into its equivalent binary form.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1A:
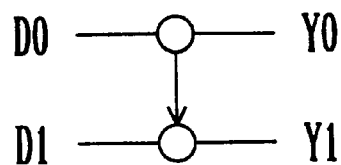
FIG. 1a is a diagram illustrating the concept of a sorter used in a parallel bit counter according to the present invention.

In accordance with the present invention, a parallel bit counter is provided which comprises 2-bit sorters arranged in accordance with a particular sorting algorithm so that it can count bits of a particular level in parallel data having an optional amount of bits. The characteristics of such 2-bit sorters will be described hereinafter in conjunction with the annexed drawings. FIG. 1a is a diagram illustrating a 2-bit sorter used in the parallel bit counter of the present invention. As shown in FIG. 1a, the 2-bit sorter is used in association with a case having two inputs D0 and D1 and two outputs Y0 and Y1.

Such a 2-bit sorter divides inputs into two groups and sorts each group. In the sorting operation, when the lower-level group is of a value greater than that of the higher-level group, the values of the groups are switched with each other. In FIG. 1a, this switching or replacement is indicated by a symbol "†".

The following Table 1 is a truth table illustrating truth values associated with the 2-bit sorter which operates as mentioned above. As shown in Table 1, when the inputs D0 and D1 have values "1" and "0", respectively, the outputs Y0 and Y1 have values of "0" and "1" in accordance with the above-mentioned principle.

TABLE 1

| D0 | D1 | Y0 | Y1 |
|----|----|----|----|
| 0  | 0  | 0  | 0  |
| 0  | 1  | 0  | 1  |
| 1  | 0  | 0  | 1  |
| 1  | 1  | 1  | 1  |

Such an input/output relationship can be expressed using a Boolean algebra expression as follows:

$$Y0 = D0 \cdot D1 = \overline{\overline{D0 \cdot D1}}$$

$$Y1 = D0 + D1 = \overline{\overline{D0 + D1}}$$

Figure 1B:
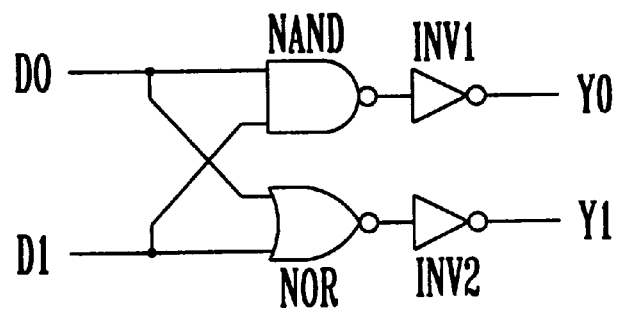
FIG. 1b is a circuit diagram illustrating a basic configuration of the sorter according to the present invention.

The circuit configuration of the 2-bit sorter, which is made using logic gates to satisfy the above-mentioned Boolean algebra expression, is illustrated in FIG. 1b. As shown in FIG. 1b, the 2-bit sorter includes a NAND gate for NANDing two input signals D0 and D1, an inverter INV1 for inverting an output from the NAND gate, thereby outputting a final output value Y0, a NOR gate for NORing the input signals D0 and D1, and another inverter INV2 for inverting an output from the NOR gate, thereby outputting a final output value Y1.

For parallel data having an increased number of bits, a sorter is configured using circuits each having the above-mentioned 2-bit sorter configuration and corresponding in number to the input bits. Now, a method for sorting such parallel input data having an increased number of bits into higher and lower-level groups using a particular sorting algorithm will be described.

The sorting method includes a pre-sorting step of dividing input data on a data bus into two groups and pre-sorting those data groups; a group sorting step of 2-bit sorting the most significant bit (MSB) of the lower-level group and the least significant bit (LSB) of the higher-level group, sequentially selecting adjacent bits in each group, and sorting the selected bits; and a post-sorting step of sorting the higher and lower-level groups using values obtained after the completion of the group sorting step, respectively. The post-sorting step is executed in the same manner as the pre-sorting step.

The above sorting steps will now be described in detail in conjunction with 4-bit input data, 6-bit input data and 8-bit input data, respectively.

Figure 2:
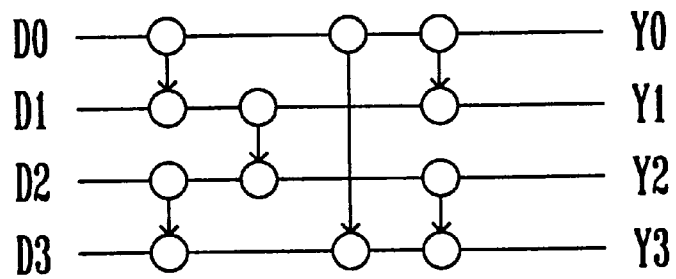
FIG. 2 is a diagram illustrating a procedure for sorting 4-bit data by use of the sorter according to the present invention.

FIG. 2 illustrates a procedure for sorting 4-bit data. As shown in FIG. 2, bits D0 to D3 of 4-bit data are first divided into two groups, one group including bits D0 and D1 while the other group includes its D2 and D3. Thereafter, a sorting is executed for each group. That is, the bits D0 and D1 are compared with each other. When the bit D0 has a value greater than that of the bit D1, the values of the bits D0 and D1 are replaced with each other. For the bits D2 and D3, the same sorting as mentioned above is carried out.

The bits pre-sorted as mentioned above are then subjected to a group sorting. That is, the MSB D1 of the lower-level group is first compared with the LSB D2 of the higher-level group in the above-mentioned manner. Subsequently, the bits D0 and D3, which are adjacent bits between the groups and next to the bits D1 and D2 respectively, are compared to each other.

After the completion of the group sorting, the resultant data is subjected to a post-sorting. This post-sorting is carried out in the same manner as the pre-sorting.

Figure 3:
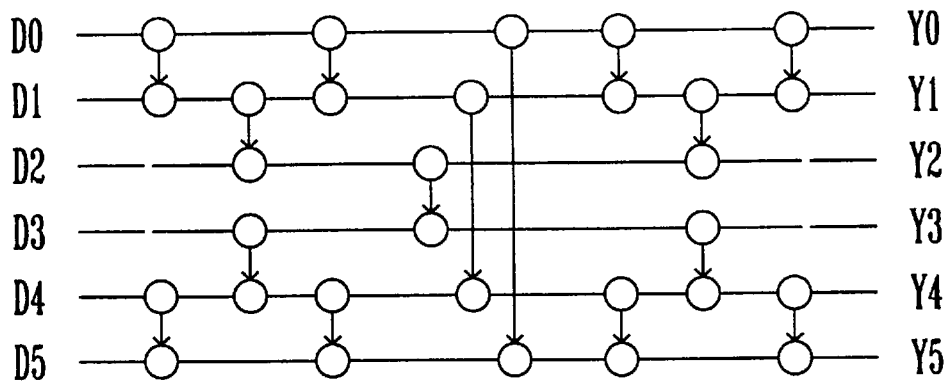
FIG. 3 is a diagram illustrating a procedure for sorting 6-bit data by use of the sorter according to the present invention.

FIG. 3 illustrates a procedure for sorting 6-bit data. As shown in FIG. 3, bits D0 to D5 of 6-bit data are first divided into two groups, one group including bits D0, D1 and D2 while the other group includes bits D3, D4 and D5. Thereafter, a sorting is executed for each group. That is, the bits D0 and D1 are compared with each other. The bits D1 and D2 are also compared with each other. Since the bit D1 may have a value varied after the comparison to the bit D2, it is then compared with the bit D0.

For the higher-level group, the same sorting as mentioned above is carried out. That is, a comparison is carried out for the bits D4 and D5, the bits D3 and D4, and the bits D4 and D5, respectively.

After the completion of the pre-sorting, the resultant data is then subjected to a group sorting. That is, the MSB D2 of the lower-level group is first compared with the LSB D3 of the higher-level group in the above-mentioned manner. Subsequently, the bits D1 and D4, which are adjacent bits between the groups and next to the bits D2 and D3 respectively, are compared to each other. The bits D0 and D5, which are adjacent bits between the groups and next to the bits D1 and D4 respectively, are then compared to each other.

After the completion of the group sorting, the resultant data is subjected to a post-sorting. This post-sorting is carried out in the same manner as the pre-sorting.

Figure 4:
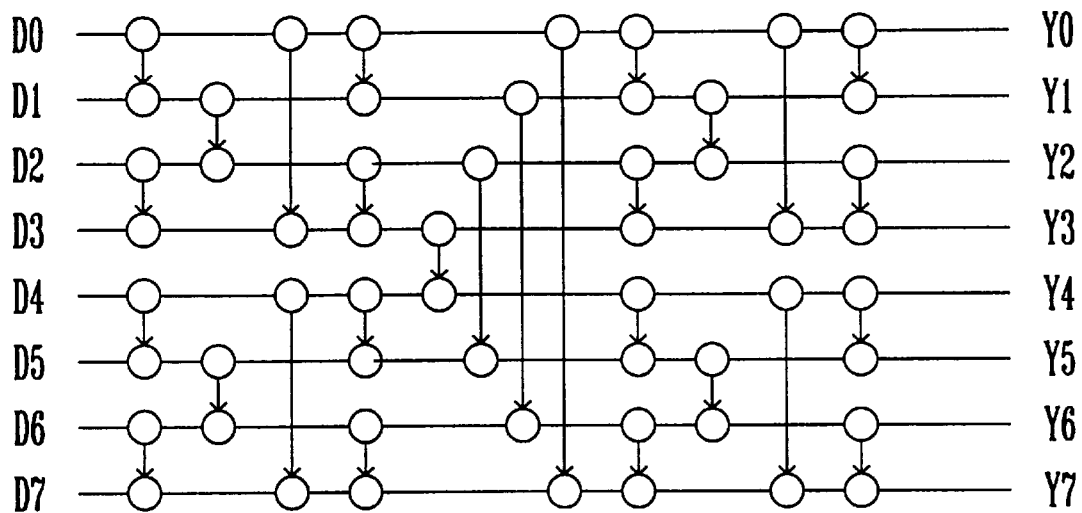
FIG. 4 is a diagram illustrating a procedure for sorting 8-bit data by use of the sorter according to the present invention.

FIG. 4 illustrates a procedure for sorting 8-bit data. As shown in FIG. 4, bits D0 to D7 of 8-bit data are first divided into two groups, one group including bits D0, D1, D2 and D3 while the other group includes bits D4, D5, D6 and D7. Thereafter, a sorting is executed for each group. That is, the bits D0 and D1 are compared with each other. The bits D2 and D3 are also compared with each other. Since the bit D1 may have a value varied after the comparison, it is then compared with the bit D2. For the same reason, a comparison is executed again for the bits D0 and D3, the bits D0 and D1, and the bits D2 and D3, respectively.

For the higher-level group, the same sorting as mentioned above is carried out. That is, a comparison is carried out for the bits D4 and D5, the bits D6 and D7, the bits D5 and D6, the bits D4 and D7, the bits D4 and D5, and the bits D6 and D7, respectively.

After the completion of the pre-sorting, the resultant data is then subjected to a group sorting. That is, the MSB D3 of the lower-level group is first compared with the LSB D4 of the higher-level group in the above-mentioned manner. Subsequently, the bits D2 and D5, which are adjacent bits between the groups and next to the bits D3 and D4 respectively, are compared to each other. The bits D1 and D6, which are adjacent bits between the groups and next to the bits D2 and D5 respectively, are then compared to each other. The bits D0 and D7, which are adjacent bits between the groups and next to the bits D1 and D6 respectively, are then compared to each other.

After the completion of the group sorting, the resultant data is subjected to a post-sorting. This post-sorting is carried out in the same manner as the pre-sorting.

Now, a procedure for counting the number of bits having a particular level in parallel data, externally applied, using outputs obtained after sorting the parallel data in accordance with the above-mentioned sorting procedure will be described.

Figure 5:
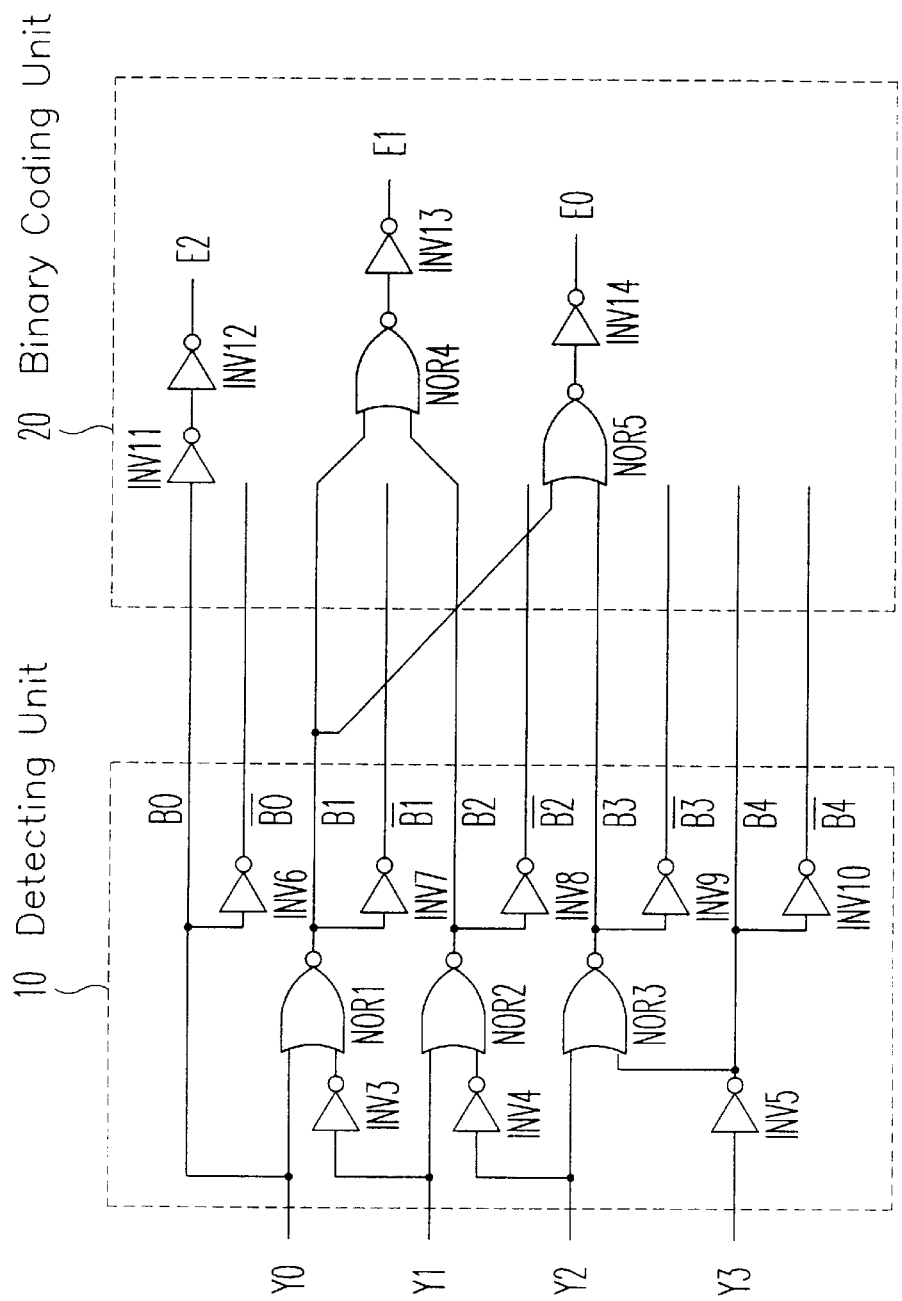
FIG. 5 is a circuit diagram illustrating a caster included in the parallel bit counter according to the present invention.

This counting procedure is executed using a caster shown in FIG. 5. As shown in FIG. 5, this caster includes a detecting unit 10 for detecting a boundary between "high" and "low" bit fields of sorted data, and a binary coding unit 20 for coding data output from the detecting unit 10 indicative of the number of "high" bits in the form of a binary number.

In the case of FIG. 5, the caster is associated with 4-bit data.

As shown in FIG. 5, the detecting unit 10 receives outputs Y0, Y1, Y2 and Y3 obtained in accordance with the above-mentioned sorting method. The detecting unit 10 includes a first NOR gate NOR1 for receiving the value Y0 (a first value) along with the value Y1 (a second value) via an inverter INV3 and NORing the received values Y0 and Y1, thereby outputting a MSB value, a second NOR gate NOR2 for receiving the value Y1 (the second value) along with the value Y2 (a third value) via an inverter INV4 and NORing the received values Y1 and Y2, thereby outputting a second MSB value, and a third NOR gate NOR3 for receiving the value Y2 (the third value) along with the value Y3 (a fourth value) via an inverter INV5 and NORing the received values Y2 and Y3, thereby outputting a third MSB value. In addition to the inverters INV3 to INV5, the detecting unit 10 also includes an inverter INV6 for outputting a value inverted from the value Y0, an inverter INV7 for outputting a value inverted from a signal output from the NOR gate NOR1, an inverter INV8 for outputting a value inverted from a signal output from the NOR gate NOR2, an inverter INV9 for outputting a value inverted from a signal output from the NOR gate NOR3, and an inverter INV10 for inverting a value output from the inverter INV5.

For data having other numbers of bits, the detecting unit 10 has a circuit configuration designed by use of circuit elements similar to those in the circuit of FIG. 5 to have output terminals corresponding in number to the number of bits output from an associated sorter, as in the above-mentioned sorter. In other words, the detecting unit 10 is configured to have n output terminals respectively corresponding to n bits output from the sorter associated therewith. The outputs from the inverters INV6, INV7, INV8, INV9 and INV10 are used for a circuit extension.

The binary coding unit 20 includes a plurality of inverters (in the illustrated case, inverters INV11 and INV12) for sequentially inverting the value Y0 output from the decoding unit 10, thereby outputting a MSB of final output data while synchronizing the MSB output with other outputs, a fourth NOR gate NOR4 for NORing the output signal from the NOR gate NOR1 and the output signal from the NOR gate NOR2, an inverter INV13 for inverting a signal output from the NOR gate NOR4, thereby outputting a second MSB of the final output data, a fifth NOR gate NOR5 for NORing the output signal from the NOR gate NOR1 and the output signal from the NOR gate NOR3, and an inverter INV14 for inverting a signal output from the NOR gate NOR5, thereby outputting a third MSB of the final output data.

For data having other numbers of bits, the binary coding unit 20 has a circuit configuration designed by use of circuit elements similar to those in the circuit of FIG. 5 to have output terminals determined in number in accordance with the number of bits output from the decoding unit. Where the number of bits output from the detecting unit 10 is "n", the number of output terminals in the binary coding unit 20 corresponds to "m" ($2^m$=n). In this case, accordingly, the binary coding unit 20 outputs data of m bits.

The following TABLE 2 is a truth table illustrating values obtained after the completion of the above-mentioned operation.

TABLE 2

| Y0 | Y1 | Y2 | Y3 | B0 | B1 | B2 | B3 | B4 | E | E0 | E2 |
|----|----|----|----|----|----|----|----|----|---|----|----|
| 0  | 0  | 0  | 0  | 0  | 0  | 0  | 0  | 1  | 0 | 0  | 0  |
| 0  | 1  | 0  | 1  | 0  | 0  | 0  | 1  | 0  | 0 | 1  | 0  |
| 0  | 0  | 1  | 1  | 0  | 0  | 1  | 0  | 0  | 1 | 0  | 0  |
| 0  | 1  | 1  | 1  | 0  | 1  | 0  | 0  | 0  | 1 | 1  | 0  |
| 1  | 1  | 1  | 1  | 1  | 0  | 0  | 0  | 0  | 0 | 0  | 1  |

The values output in accordance with the above-mentioned operation of the caster can be expressed using a Boolean algebra expression as follows:

$$B0 = \overline{Y0 + VSS} = Y0$$

$$B1 = \overline{Y1 + Y0}$$

$$B2 = \overline{Y2 + Y1}$$

$$B3 = \overline{Y3 + Y2}$$

$$B4 = \overline{YDD + Y3} = \overline{VSS + Y3} = Y3$$

$$E0 = \overline{B3 + B1}$$

$$E1 = \overline{B1 + B2}$$

$$E2 = B0$$

Now, the procedure for counting the number of "high" bits in parallel data in accordance with a sorting algorithm using the caster and 2-bit sorter having the above-mentioned configurations will be described in conjunction with the case in which the parallel data is of 4 bits.

Assuming that the bits D0 to D3 of the input data have values of 0, 1, 1 and 0 (D0=0, D1=1, D2=1, and D3=0), the data is sorted through the bit sorter as follows.

By a pre-sorting operation, the data is sorted into two groups, one group including the bits D0 and D1 while the other group includes the bits D2 and D3. Thereafter, a data comparison is executed for the data of each group. As a result, the data of "0110" is changed to "0101".

A group sorting is then carried out for the changed data. After the completion of the group sorting, the data is changed to "0011". The data changed by the group sorting is then subjected to a post-sorting. In the post-sorting, a data comparison is executed for the data of each group in the same manner as in the presorting. After the post-sorting, the entire sorting procedure is completed.

The values Y0 to Y3 obtained after the completion of the sorting procedure correspond to "0", "0", "1" and "1", respectively. When the data "0011" is applied to the caster, the detecting unit 10 of the caster, which serves to detect a boundary between "high" and "low" bit fields of the input data, outputs bits B0 to B3 respectively having values of "0", "0", "1" and "0" (B0=0, B1=0, B2=1, and B3=0). These values are then applied to the binary coding unit 20 which, in turn, outputs bits E0 to E2 respectively having values of "0", "1" and "0" (E0=0, E1=1, and E2=0).

The output data from the binary coding unit 20 is then converted into its equivalent decimal form. For the data of "010", accordingly, a value of "2" is obtained. This value means that the 4-bit input data currently applied has 2 "high" bits.

In such a manner, the number of bits having a particular level in parallel input data is counted at a high speed.

Figure 6:
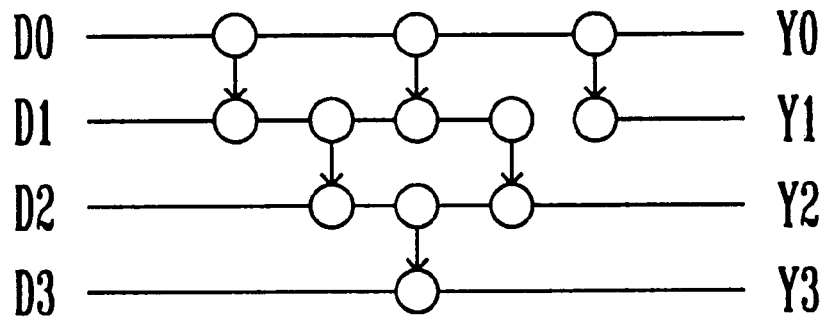
FIG. 6 is a diagram illustrating a sorting system applied to the sorter according to the present invention.

FIG. 6 is a diagram illustrating another sorting method applied to the above-mentioned 2-bit sorter. In accordance with the illustrated method, 4-bit parallel data is sorted in an insertion sort manner.

Every pair of two successive bits of 4-bit data on a data bus are compared with each other in a lower-level bit order, namely, in the order of D0/D1, D1/D2, and D2/D3. When the lower-level one of the compared bits has a value greater than that of the higher-level one, the values of those bits are switched with each other. After the comparison is completed for all input bus lines, a comparison is carried out again for bits which may vary in value due to the value replacement. This re-comparison is executed for the compared bus lines except for the MSB bus line, namely, for the bits D0 and D1 and the bits D1 and D2.

After the completion of the re-comparison, a comparison is carried out again for bits which may vary in value due to a possible value replacement. This re-comparison is executed for the compared bus lines except for the second MSB bus line. Such a comparison procedure is repeatedly executed until only the bits D0 and D1 on the LSB bus line and second LSB bus line are re-compared.

Output values Y0 to Y3 obtained by the above-mentioned sorting operation are then applied to the caster so as to count the number of "high" bits in the input data. This counting operation is carried out in the same manner as mentioned above.

Figure 7:
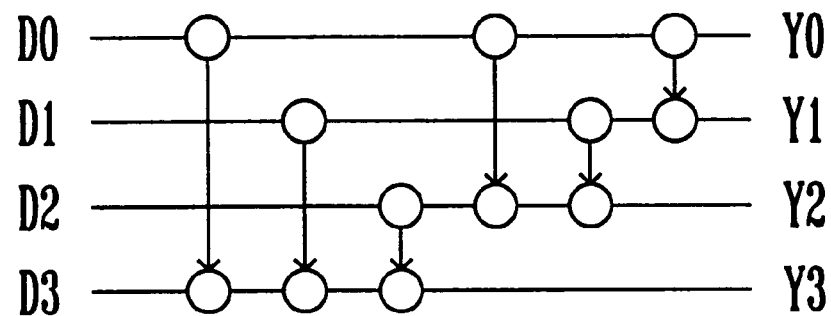
FIG. 7 is a diagram illustrating another sorting system applied to the sorter according to the present invention.

FIG. 7 is a diagram illustrating another sorting method applied to the above-mentioned 2-bit sorter. In accordance with the illustrated method, 4-bit parallel data is sorted in a selection sort manner.

In accordance with this method, the LSB D0 of 4-bit data on a data bus is first compared with the MSB D3 of the input data. When the LSB D0 has a value higher than that of the MSB D3, the values of those bits are switched with each other. Thereafter, the second LSB D1 of the input data is compared with the MSB D3 of the input data. Such a comparison procedure is repeatedly executed until the second MSB D2 is compared with the MSB D3.

After the above comparison is completed, a comparison is carried out again for bits which may vary in value due to the value replacement. This re-comparison is executed for bits except for the MSB D3 while using the second MSB D2 as a reference bit.

After the completion of the re-comparison, a comparison is carried out again for bits which may vary in value due to a possible value replacement. This re-comparison is repeatedly executed until the LSB D0 and second LSB D1 are compared.

Output values Y0 to Y3 obtained by the above-mentioned sorting operation are then applied to the caster so as to count the number of "high" bits in the input data.

The parallel bit counter using the bit sorter according to the present invention is applicable to all electronic circuits which require an operation for counting the number of bits having a particular level in parallel input data at a high speed. For instance, the parallel bit counter of the present invention is applicable to summers for binary data such as data of a variety of sensor arrays including digital cameras, photon counters, scanners, facsimiles, and interfaces between neural processors and digital processors. The parallel bit counter of the present invention may also be incorporated in a random number generator so that it is applicable to a binomially distributed random number generator. In addition, the parallel bit counter of the present invention is applicable to error correction codes used in data communications using parallel ports.

As apparent from the above description, the present invention provides a parallel bit counter for counting the number of bits having a particular level in parallel input data, which counter includes a 2-bit sorter adapted to sort the input data and a caster adapted to count the number of the particular bits, based on the sorted data. Accordingly, the parallel bit counter of the present invention can prevent a degradation in the counting speed resulting from a multiple adder operation and a carry set-up time.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A counter for counting the number of bits having a particular level in parallel input data consisting of n ("n" is a natural number) bits, comprising:

a sorter having n input terminals respectively adapted to receive the n bits of the parallel input data and n output terminals respectively adapted to output n output bits, the sorter serving to sort "high" and "low" bit fields of the input data, respectively; and a caster having n input terminals respectively adapted to receive the n output bits from the sorter and n output terminals, the caster including a detecting unit adapted to detect a boundary between the "high" and "low" bit fields of the data sorted by the sorter, and a binary coding unit adapted to code output data from the detecting unit, indicative of the number of "high" bits included in the input data, into its equivalent binary form.

2. The counter in accordance with claim 1, wherein the sorter including:

a pre-sorting for dividing the n-bit input data into two n/2-bit groups and repeatedly 2-bit sorting each of the divided groups;

a group sorting for 2-bit sorting the most significant bit of the lower-level one of the divided groups with the least significant bit of the higher-lever group after completion of the pre-sorting operation, and sequentially sorting all adjacent bits in each of the groups; and a post-sorting for repeatedly 2-bit sorting each of the groups processed by the group sorting operation.

3. The counter in accordance with claim 2, wherein the pre-sorting operation comprises the steps of:

comparing every pair of two adjacent bits in each of the n/2-bit groups, and switching values of the compared adjacent bits with each other when the lower-level one of the compared adjacent bits is greater than the higher-level one of the compared adjacent bits;

executing the group sorting operation for each of the groups so as to re-sort bits in the group varying in value due to the comparison; and executing the pre-sorting operation for each of the groups so as to re-sort bits in the group varying in value due to the group sorting operation.

4. The counter in accordance with claim 2, wherein the post-sorting operation is carried out in the same manner as the pre-sorting operation.

5. The counter in accordance with claim 2, wherein the sorter comprises 2-bit sorters each adapted to execute each 2-bit sorting required in each of the sorting operation, each of the 2-bit sorters including a NAND gate for NANDing two input signals, an inverter for inverting an output from the NAND gate, thereby outputting a first output value, a NOR gate for NORing the two input signals, and another inverter for inverting an output from the NOR gate, thereby outputting a second output value.

6. The counter in accordance with claim 5, wherein the 2-bit sorters combined together in multiple in accordance with a sorting system used so that the sorter can process n bits.

7. The counter in accordance with claim 1, wherein the sorter is adapted to execute an insertion sorting operation comprising the steps of:

comparing every pair of two adjacent bits in the n-bit input data, and switching values of the compared adjacent bits with each other when the lower-level one of the compared adjacent bits is greater than the higher-level one of the compared adjacent bits;

executing again the comparison for all bits of the compared input data except for the most significant bit so as to re-sort bits in the compared input data varying in value due to the comparison;

executing again the comparison for all bits of the re-compared input data except for the second most significant bit so as to re-sort bits in the re-compared input data varying in value due to the re-comparison; and repeatedly executing the above procedure until the least significant bit and second least significant bit of the input data are compared to each other.

8. The counter in accordance with claim 7, wherein the sorter comprises 2-bit sorters each adapted to execute each 2-bit sorting required in each of the sorting operation, each of the 2-bit sorters including a NAND gate for NANDing two input signals, an inverter for inverting an output from the NAND gate, thereby outputting a first output value, a NOR gate for NORing the two input signals, and another inverter for inverting an output from the NOR gate, thereby outputting a second output value.

9. The counter in accordance with claim 7, wherein the 2-bit sorters are composed together in multiple in accordance with a sorting system used so that the sorter can process n bits.

10. The counter in accordance with claim 1, wherein the sorter is adapted to execute a selection sorting operation comprising the steps of:

sequentially comparing bits in the n-bit input data with the most significant bit starting from the least significant bit, and switching values of the compared bits with the value of the most significant bit when the values of the compared bits are greater than the value of the most significant bit;

executing again the comparison and replacement for bits of the compared input data to the second most significant bit so as to re-sort bits in the compared input data varying in value due to the comparison; and repeatedly executing the above procedure until the least significant bit of the input data is compared to the second least significant bit of the input data.

11. The counter in accordance with claim 10, wherein the sorter comprises 2-bit sorters each adapted to execute each 2-bit sorting required in each of the sorting operation, each of the 2-bit sorters including a NAND gate for NANDing two input signals, an inverter for inverting an output from the NAND gate, thereby outputting a first output value, a NOR gate for NORing the two input signals, and another inverter for inverting an output from the NOR gate, thereby outputting a second output value.

12. The counter in accordance with claim 1, wherein the detecting unit comprises:

a first output terminal for receiving a first one of the output bits from the sorter along with a second one of the output bits via a first inverter and NORing the received bits, thereby outputting a most significant bit value;

a second output terminal for receiving the second output bit along with a third one of the output bits via a second inverter and NORing the received values, thereby outputting a second most significant bit value;

a third output terminal for receiving the third output bit along with a fourth one of the output bits via a third inverter and NORing the received values, thereby outputting a third most significant bit value;

a fourth inverter for outputting a value inverted from the first output bit;

a fifth inverter for outputting a value inverted from the most significant bit value output from the first output terminal;

a sixth inverter for outputting a value inverted from the second most significant bit value output from the second output terminal;

a seventh inverter for outputting a value inverted from the third most significant bit value output from the third output terminal; and an eighth inverter for inverting the value output from the third inverter;

so that the decoding unit has n output terminals respectively corresponding to the n bits output from the sorter, thereby outputting data of n bits.

13. The counter in accordance with claim 12, wherein the binary coding unit comprises:

a plurality of inverters for sequentially inverting the first bit output from the decoding unit, thereby outputting a most significant bit of final output data while synchronizing the most significant bit output with other outputs;

a first NOR gate for NORing the signal output from the first output terminal of the detecting unit and the signal output from the second output terminal of the detecting unit;

a fourth output terminal for inverting a signal output from the NOR gate, thereby outputting a second most significant bit of the final output data;

a second NOR gate for NORing the output signal from the first output terminal of the detecting unit and the output signal from the third output terminal; and a fifth output terminal for inverting a signal output from the second NOR gate, thereby outputting a third most significant bit of the final output data;

so that the binary coding unit has output terminals determined in number in accordance with the number of bits output from the decoding unit, thereby outputting data of m ($2^m$=n) bits for the n bits output from the detecting unit.

* * * * *